(12) United States Patent
Bone et al.

(10) Patent No.: US 9,561,987 B2
(45) Date of Patent: Feb. 7, 2017

(54) METHOD FOR DEPOSITION OF CERAMIC FILMS

(75) Inventors: Adam Bone, West Sussex (GB); Richard Dawson, West Sussex (GB); Robert Leah, Surrey (GB)

(73) Assignee: CERES INTELLECTUAL PROPERTY COMPANY LIMITED (GB)

( * ) Notice: Subject to any disclaimer, the term of this patent is extended or adjusted under 35 U.S.C. 154(b) by 315 days.

(21) Appl. No.: 12/997,687

(22) PCT Filed: Apr. 30, 2009

(86) PCT No.: PCT/GB2009/001103
§ 371 (c)(1),
(2), (4) Date: Mar. 5, 2011

(87) PCT Pub. No.: WO2009/090419
PCT Pub. Date: Jul. 23, 2009

(65) Prior Publication Data
US 2011/0143038 A1    Jun. 16, 2011

Related U.S. Application Data

(60) Provisional application No. 61/073,598, filed on Jun. 18, 2008.

(30) Foreign Application Priority Data

Jun. 13, 2008 (GB) .................................. 0810909.2
Jun. 16, 2008 (GB) .................................. 0801989.4
Dec. 30, 2008 (GB) .................................. 0823668.9

(51) Int. Cl.
*B05D 5/12* (2006.01)
*C04B 41/45* (2006.01)
(Continued)

(52) U.S. Cl.
CPC ......... *C04B 41/4537* (2013.01); *C04B 41/009* (2013.01); *C04B 41/52* (2013.01);
(Continued)

(58) Field of Classification Search
USPC ......................................................... 427/115
See application file for complete search history.

(56) References Cited

U.S. PATENT DOCUMENTS

| 4,963,390 A | 10/1990 | Lipeles et al. |
| 5,273,776 A | 12/1993 | Yonezawa et al. |

(Continued)

FOREIGN PATENT DOCUMENTS

| EP | 1 202 369 B1 | 5/2002 |
| EP | 1 699 104 A1 | 9/2006 |

(Continued)

OTHER PUBLICATIONS

Mai et al. "Ferrite-based perovskites as cathode materials for anode-supported solid oxide fuel cells Part II. Influence of the CGO interlayer" (2005).*

(Continued)

*Primary Examiner* — Austin Murata
(74) *Attorney, Agent, or Firm* — Shapiro, Gabor and Rosenberger, PLLC

(57) ABSTRACT

The present invention is concerned with methods for the deposition of ceramic films on ceramic or metallic surfaces, particularly the deposition of sub-micron thickness ceramic films such as films of stabilised zirconia and doped ceria such as CGO (cerium gadolinium oxide). The present invention is particularly useful in the manufacture of high and intermediate temperature operating fuel cells including solid oxide fuel cells (SOFC) and also metal supported intermediate temperature SOFC operating in the 450-650° C. range.

23 Claims, 8 Drawing Sheets

(51) Int. Cl.
  C04B 41/00    (2006.01)
  C04B 41/52    (2006.01)
  C04B 41/87    (2006.01)
  C04B 41/89    (2006.01)
  C23C 18/12    (2006.01)
  H05B 6/46     (2006.01)
  C04B 111/00   (2006.01)
  H01M 8/12     (2016.01)
  B29K 27/06    (2006.01)

(52) U.S. Cl.
  CPC ............. *C04B 41/87* (2013.01); *C04B 41/89* (2013.01); *C23C 18/1208* (2013.01); *C23C 18/1225* (2013.01); *C23C 18/1241* (2013.01); *C23C 18/1245* (2013.01); *H01M 8/124* (2013.01); *H05B 6/46* (2013.01); *B29K 2027/06* (2013.01); *C04B 2111/00853* (2013.01); *H01M 8/126* (2013.01); *H01M 8/1226* (2013.01); *H01M 8/1253* (2013.01); *Y02E 60/523* (2013.01); *Y02E 60/525* (2013.01); *Y02P 70/56* (2015.11)

(56) References Cited

U.S. PATENT DOCUMENTS

| | | | |
|---|---|---|---|
| 5,494,700 A * | 2/1996 | Anderson et al. | 427/115 |
| 6,139,985 A | 10/2000 | Borglum et al. | |
| 2002/0048699 A1 | 4/2002 | Steele et al. | |
| 2003/0229243 A1 * | 12/2003 | Ishida et al. | 560/224 |
| 2004/0126488 A1 * | 7/2004 | Lane | 427/226 |
| 2005/0026017 A1 | 2/2005 | Seabaugh et al. | |
| 2005/0158466 A1 | 7/2005 | Sato et al. | |
| 2005/0266297 A1 * | 12/2005 | Irvine et al. | 429/40 |
| 2006/0141137 A1 * | 6/2006 | Anderson et al. | 427/115 |
| 2007/0082254 A1 * | 4/2007 | Hiwatashi | 429/44 |
| 2007/0134428 A1 | 6/2007 | Carlson et al. | |
| 2007/0180689 A1 * | 8/2007 | Day et al. | 29/623.5 |
| 2009/0075146 A1 * | 3/2009 | Striker et al. | 429/33 |

FOREIGN PATENT DOCUMENTS

| | | |
|---|---|---|
| EP | 1 887 843 A1 | 2/2008 |
| JP | 61-261235 A | 11/1986 |
| JP | 63-293168 A | 11/1988 |
| JP | 2-116620 A | 5/1990 |
| WO | WO 96/29712 A1 | 9/1996 |
| WO | WO 02/17420 A2 | 2/2002 |

OTHER PUBLICATIONS

Eschenbaum et al., "Thin films of proton conducting $SrZrO_3$-ceramics prepared by the sol-gel method", Solid State Ionics 77 (1995) pp. 222-225.

Gaudon et al., "Evaluation of a sol-gel process for the synthesis of $La_{1-x}Sr_x MnO_{3+\delta}$ cathodic multilayers for solid oxide fuel cells", Journal of Power Sources 133 (2004) pp. 214-222.

Kim, W-H., et al., "Intermediate temperature solid oxide fuel cell using $(La,Sr)(Co,Fe)O_3$-based cathodes", Solid State Ionics 177, 2006, pp. 3211-3216.

* cited by examiner

METHOD FOR DEPOSITION OF CERAMIC FILMS

CROSS-REFERENCE TO RELATED APPLICATION

This application claims the benefit of U.S. Provisional Application No. 61/073,598 filed Jun. 18, 2008.

The present invention is concerned with methods for the deposition of ceramic films on ceramic or metallic surfaces, particularly the deposition of sub-micron thickness ceramic films such as films of stabilised zirconia and doped ceria such as CGO (cerium gadolinium oxide). The present invention is particularly useful in the manufacture of high and intermediate temperature operating fuel cells including solid oxide fuel cells (SOFC) and also metal supported intermediate temperature SOFC operating in the 450-650° C. range.

Fuel cells, fuel cell stack assemblies, fuel cell stack system assemblies and the like are well known in the prior art and relevant teachings include the likes of WO 02/35628, WO 03/075382, WO 2004/089848, WO 2005/078843, WO 2006/079800, WO 2006/106334, WO 2007/085863, WO 2007/110587, WO 2008/001119, WO 2008/003976, WO 2008/015461, WO 2008/053213, WO 2008/104760, and WO 2008/132493, all of which are incorporated herein by reference in their entirety.

There has been a drive over a number of years to lower the operating temperature of SOFCs (Solid Oxide Fuel Cells) from the traditional 800-1000° C., down to 600° C. or below. It has been recognised that achieving this requires the use of a different set of materials from those traditionally used for SOFCs. In particular, this entails the use of cathode materials with increased catalytic activity and electrolyte materials with higher oxygen ion conductivity than the traditional yttria-stabilised zirconia (YSZ) when operating between 450-650° C. At the present time it is known that it is not possible to effectively produce a YSZ based fuel cell electrolyte that works below 700° C.

The higher-performance cathode materials are typically perovskite oxides based on cobalt oxide, such as LSCF (lanthanum strontium cobalt ferrite), LSC (lanthanum strontium cobaltite) and SSC (samarium strontium cobaltite). The more conductive electrolyte materials are typically either (i) rare-earth-doped ceria such as SDC (samarium-doped ceria) and GDC (gadolinium-doped ceria), or (ii) materials based on lanthanum gallate, such as LSGM (lanthanum-strontium-magnesium gallate).

The conductivity of zirconia can also be significantly improved by doping with scandia rather than yttria, although this is a more costly material.

Unfortunately, materials with higher performance at lower temperatures are frequently less stable than the traditional high-temperature materials. Particular problems frequently encountered are:

High performance cathode materials react with zirconia to form strontium or lanthanum zirconate, which is a very poor ionic conductor, leading to performance degradation.

LSGM reacts with nickel oxide which is normally found in the anode

Doped ceria can be partially reduced when exposed to a fuel atmosphere, developing mixed ionic/electronic conductivity. This in turn causes the cell to develop an internal short-circuit, reducing operating efficiency.

Doped ceria and zirconia can react if processed at temperatures in excess of 1200° C., producing a poorly conductive mixed phase.

To mitigate these undesirable material interactions, it is frequently desirable to have a composite electrolyte in which the electrolyte consists of a main layer and one or more interlayers. The main layer performs the primary functions of conducting oxygen ions from the cathode to the anode, and providing a gas-tight barrier to physically separate the reactants. The interlayer(s) are thin film(s) of another electrolyte material which separate the main electrolyte layer from one or both electrodes, preventing detrimental interactions. Typical uses of interlayers include:

An interlayer of doped ceria deposited between a zirconia main electrolyte layer and a cobaltite cathode to avoid the formation of zirconates and to improve the catalytic activity of the cathode.

An interlayer of doped ceria deposited between an LSGM main electrolyte and an anode to avoid reaction with nickel oxide found in the anode.

It is known that production of a thin (<1000 nm) even continuous impermeable film is not a straightforward process for cost effective fuel cell production. Material quality, reproducibility and process costs mean that traditional powder routes, sintering routes and plasma or vacuum spray deposition routes are not attractive for high-volume manufacture.

U.S. Pat. No. 7,261,833 discloses methods for producing aqueous suspension of a crystalline nanoscale ceramic electrolyte material and modifying the suspension by adding coarse particles of the ceramic electrolyte material and at least one water soluble additive selected from a binder and a surfactant. It then discloses deposition of this suspension onto porous anode of a solid oxide fuel cell to generate a layer 10-80 microns thick and subsequently heating to generate a dense film of 5-40 microns thick. This patent also discloses, without significant details, (Col 10 Lines 32-44) that the same process can be used to generate interlayers between the anode and the electrolyte, between the cathode and the electrolyte and also between both the anode and the cathode and the electrolyte. An example is given (Example 6 Col 16) for the deposition and high temperature sintering of a tri-layer LSM substrate, PSM and GDC interlayer and YSZ electrolyte structure. The preferred deposition process involved depositing thick layers of YSZ (10-80 microns thick) by use of aerosol techniques, and then firing at temperatures between 1250-1400° C. This firing regime is not suitable for high volume manufacture where the additional firing steps, high temperature add significant time and cost to the fuel cell manufacture process. In addition, firing at such temperature is not suitable for metal supported fuel cells where such high temperatures will cause rapid metal species migration and oxide layer build up if an atmosphere involving air is used. This publication does not disclose how to deposit thin layers of interlayer material (<1000 nm thick) on impermeable layers, and also does not disclose how to process such layers to an impermeable state at <1100° C.

EP1202369 describes an anode supported solid oxide fuel cell where a ScSZ interlayer is deposited between a YSZ or ScSZ based cermet anode and a ScSZ electrolyte to lower the fuel cell resistance at lower operating temperatures. The interlayer is a cermet structure involving a catalyst and a electrolyte material. The interlayer is deposited onto a pre-sintered, tape cast electrode and sintered. The example given discloses screen printing of the interlayer, followed by sintering at 1300° C. This firing regime is not suitable for high volume manufacture where the additional firing steps, high temperature add significant time and cost to the fuel cell manufacture process. In addition, firing at such temperature is not suitable for metal supported fuel cells where such high temperatures will cause rapid metal species migration and oxide layer build up if an atmosphere involving air is used. The patent does not disclose how a thin interlayer (<1000 nm) can be deposited on top of a porous electrode and processed to an impermeable layer at less than 1100° C. The patent does recognise that obtaining thin, gas tight (impermeable) layers is a significant issue that leads to an increase in the thickness of such layers.

WO02/17420 describes the use of a barrier layer between the anode and the electrolyte of a solid oxide fuel cell to control the chemical reactions between the electrolyte and the anode and/or the use of a strengthening layer between the electrolyte and the cathode to increase the fracture resistance of the electrolyte. This patent states that the barrier layer should be between 1-30 microns thick, with thicknesses below 1 micron being ineffective due to the non-uniformity of the barrier layer leaving areas of the electrolyte exposed. The strengthening layer is a multi-layer structure with a thickness of 5-15 microns thick. The layers for the fuel cell are tape cast and rolled together using well know tape calendaring techniques. FIG. 5b shows a ceria layer between a YSZ electrolyte and an anode, with the typical anodes being Ni-YSZ. The publication does not disclose the sintering temperature for such structures, though it would be expected that such processing temperatures are in excess of 1100° C. with excess of 1250° C. widely used. This firing regime is not suitable for high volume manufacture where the additional firing steps, high temperature add significant time and cost to the fuel cell manufacture process. In addition, firing at such temperature is not suitable for metal supported fuel cells where such high temperatures will cause rapid metal species migration and oxide layer build up if an atmosphere involving air is used. The patent does not disclose how a thin interlayer (<1000 nm) can be deposited on a porous electrode and processed to form an impermeable layer at less than 1100° C.

U.S. Pat. No. 6,139,985 describes the use of a dense, continuous interlayer between the electrolyte and the air cathode of a solid oxide fuel cell where the interlayer is a dense cerium oxide layer grown in the air cathode layer—forming a continuous layer around the air electrode particles using a CVD process. This process involves complex material preparation, deposition and processing to achieve acceptable results; it is therefore costly, and is not applicable to high volume manufacturing.

WO 96/29712 is directed to varistors (non-ohmic variable resistors) and methods of making same, specifically using zinc oxide. This publication describes the deposition of a sol-gel onto a substrate followed by a drying step and an annealing step in which crystallisation occurs. Notably, this publication makes no suggestion of depositing additional layers of solution prior to the annealing/crystallisation step.

Other prior art includes EP 1887843, JP 63293168 and JP 61261235.

However, it is widely reported that the deposition of interlayers within an electrolyte can be difficult, particularly by means of conventional sintering processes. This is particularly the case if there is a requirement for the interlayer to be dense, or if there is a limit on the maximum permissible sintering temperature. Such limits apply if the cell is supported on a metal substrate (preferably sintering <1100° C.), or when trying to sinter doped ceria and zirconia together without forming a non-conductive phase (preferably sintering <1200° C.).

Thus, the deposition of interlayers within an electrolyte presents fundamental problems when it is desired for the interlayer to be dense, when the interlayer is to form part of a metal-supported solid oxide fuel cell, and where doped ceria and zirconia are to be sintered together. These problems are even more substantial when the interlayer is to be formed within an electrolyte of a metal-supported intermediate temperature solid oxide fuel cell, the maximum manufacturing process temperature being <1100° C.

The present invention seeks to overcome these prior art disadvantages. Thus, according to the present invention there is provided a method for depositing at least one layer of metal oxide crystalline ceramic upon a surface of a substrate, the method comprising the steps of:
  (i) depositing a solution of a soluble salt precursor of a metal oxide crystalline ceramic onto said surface of said substrate to define a layer of said solution of said soluble salt precursor on said surface, said surface being selected from the group consisting of: a metallic surface and a ceramic surface;
  (ii) drying said solution of said soluble salt precursor to define a layer of said soluble salt precursor on said surface;
  (iii) heating said soluble salt precursor on said surface to a temperature of between 150 and 600° C. to decompose it and form a layer of metal oxide film on said surface;
  (iv) repeating steps (i)-(iii) at least one additional time, said solution of said soluble salt precursor being deposited onto said metal oxide film, such that said metal oxide film on said surface comprises a plurality of layers of metal oxide; and
  (v) firing said substrate with said metal oxide film on said surface at a temperature of 500-1100° C. to crystallise said metal oxide film into a layer of metal oxide crystalline ceramic bonded to said surface of said substrate,
wherein each of steps (ii), (iii) and (v) is performed in an air atmosphere.

Preferably, each of steps (i)-(v) is performed in an air atmosphere. This is commercially highly valuable and convenient since it avoids the need to perform the process steps in a sealed or highly controlled gas environment using costly atmospheres.

By "solution" is meant a true solution comprised of at least one substance (the solute) in at least one other substance (the solvent), i.e. excludes the presence of solid particles and thus excludes liquid colloidal dispersion, colloidal solutions, and mechanical suspensions.

Experiments undertaken by the present inventors have shown that the presence of any solids in the layer of step (i) generate stress points which result in cracking and therefore loss of layer integrity. Thus, the present inventors have found that it is desirable to have a thin layer deposition process that dries and anneals in a homogenous way. Depositing a homogeneous layer allows for homogeneous drying and annealing with low risk of cracking. A layer made from a sol-gel mix or suspension containing solid particles will tend to dry an uneven way and also sinter in a non-homogeneous way with the suspension areas drying faster than those around the particle or gel, creating mechanical drying and annealing stresses which can lead to cracking. To create a layer of sufficient thickness it is therefore necessary to deposit several thin layers.

Further, it is noted that the method of WO 96/29712 explicitly excludes the method of the present invention since the sol-gel transitions directly to a crystallised form at the annealing temperature and does not have the intermediate form of step (iii) of the present invention. Thus, to generate a crack free layer it would be necessary to deposit and anneal several times. This increases process time and cost, and if the annealing is carried out in air using a metal substrate, also increases the number of times that the metal substrate is exposed to oxide layer growth conditions and to metal ion migration from the metal or oxide layer to the fuel cell electrode and electrolyte layers—both results are undesirable, particularly for the manufacture, operation and durability of fuel cells.

WO 96/29712 also teaches that spin coating is used with the sol, inevitably resulting in a non-uniform distribution of particles, in turn meaning that the metal oxide crystalline ceramic is non-uniform and non-homogeneous across the surface of the substrate, creating further risk of mechanical failure and non-uniform/sub-optimal in-use performance of the final product. The use of sols may also limit the density of the metal oxide crystalline ceramic which can be achieved, in turn limiting in-use performance since in the case of fuel cell and air separation device electrolyte layers a high density is preferable in order to (i) electrically insulate the electrodes from one another and prevent short-circuiting, and (ii) ensure that it is gas impermeable.

As will be noted, the method of the present invention allows the deposition of a layer of metal oxide crystalline ceramic and thus the manufacture of solid oxide fuel cells without the requirement for uneconomic, inconvenient or impractical processing conditions such as high vacuum or temperatures in excess of 1100° C. This allows the use of substrates such as stainless steel substrates such as ferritic stainless steel.

Preferably the maximum temperature of firing step (v) is no greater than 1000° C. At process temperatures above 1000° C., more rapid oxidation of the steel occurs and migration of volatile metal species occurs, particularly chromium which is readily found in e.g. stainless steels such as ferritic stainless steel, into typical cathode and/or electrolyte and/or anode materials is known to lead to loss of performance of the fuel cell.

It will also be recognised that prior-art embodiments (for example those of WO 02/17420) of a composite zirconia/ceria electrolyte structure have placed the zirconia layer between the ceria and the anode, i.e. in contact with the anode. This has certain theoretical advantages wherein provided that the zirconia layer is gas impermeable, the reduction of the CGO layer above is avoided, thus entirely avoiding the problem of mixed conductivity. However, such prior art embodiments have significant shortcomings which the present invention seeks to overcome, notably:

At low SOFC operating temperatures (<600° C.) the catalytic activity of the anode is likely to be impaired at the anode-electrolyte interface by using zirconia for the electrolyte, which has a much lower ionic conductivity than doped ceria.

It is difficult to fabricate such embodiments without co-sintering the zirconia and CGO at a temperature where deleterious material interactions will occur, and above the maximum processing temperature for a metal-supported SOFC.

Thus, preferably the method of the present invention is a method of depositing a fuel cell or air separation device electrolyte interlayer, the surface being an electrolyte surface and the method additionally comprising the steps of depositing an at least one additional layer upon the at least one layer of metal oxide crystalline ceramic, and depositing an electrode layer upon the at least one additional layer such that the at least one layer of metal oxide crystalline ceramic does not contact the electrode layer. More preferably, the electrode layer is a cathode layer.

It is further noted that in contrast to the prior art, the method of the present invention cannot be used to fabricate a layer directly onto a porous electrode substrate where the permeability of the electrode pores would result in the solution of step (i) (solution of a soluble salt precursor of a metal oxide crystalline ceramic) soaking into the porous structure rather than forming a continuous layer on its surface which could then become an impermeable layer.

Thus the present invention is particularly suitable for depositing metal oxide crystalline layers onto the surface of pre-formed, impermeable ceramic layers and onto the surface of impermeable metallic surfaces, such as metal or steel, e.g. Ferritic stainless steel foil substrates.

The present invention is particularly applicable to metal supported intermediate temperature fuel cell designs such as those disclosed in GB2368450 and GB2434691.

More particularly, the present invention is useful in the manufacture of an interlayer of stabilised zirconia deposited within a doped ceria main electrolyte of a fuel cell to electronically insulate the fuel cell electrodes from one another and prevent internal short-circuiting.

Preferably, the surface of the substrate prior to deposition of the at least one layer of metal oxide crystalline ceramic is generally flat or continuously smooth. Preferably, the surface of the substrate is generally impermeable, i.e. is non-porous and impermeable to liquids. Preferably, the substrate is capable of withstanding rapid thermal cycling.

Thus, the method of the present invention is particularly well suited to the deposition of layers of metal oxide crystalline ceramics as part of SOFCs, more preferably low- or intermediate-temperature SOFCs. In particular, the method of the present invention is well suited to the deposition of layers of metal oxide crystalline ceramic as part of metal-supported SOFCs, more preferably low- or intermediate-temperature metal-supported SOFCs, wherein the inherent robustness of the metal support (preferably a foil made from stainless steel such as a ferritic stainless steel, and more preferably a foil with a perforated region surrounded by a non-perforated region) allows rapid thermal cycling, whilst imposing limits upon the maximum process temperature which are within the parameters of the present invention.

Thus, the surface is preferably an electrolyte layer, more preferably an electrolyte layer made from a mixed ionic electronic conducting electrolyte material, more preferably a CGO electrolyte layer. Other preferred ceramic surfaces onto which the deposition takes place include scandia stabilised zirconia (ScSZ) and scandia yttria co-stabilised zirconia (ScYSZ).

Preferably, the layer of metal oxide crystalline ceramic is a dense layer. Preferably, the layer of metal oxide crystalline ceramic is at least 90% dense (i.e. at least 90% of its theoretical density). More preferably, it is at least 91, 92, or 93% dense. Most preferably it is at least 93% dense. The layer of metal oxide crystalline ceramic is preferably gas-impermeable. This is of particular relevance to the use of the present invention in the manufacture of fuel cell electrolytes where the deposited layer of metal oxide crystalline ceramic may comprise zirconia, and where it is desirable for an interlayer to be ion-permeable, electrically insulating, and gas-impermeable to prevent internal short-circuiting.

It is desirable that the soluble salt precursor when deposited onto the surface spreads and dries as a continuous, even film. Preferably, the solution of a soluble salt precursor of a metal oxide crystalline ceramic is deposited onto the surface by a method selected from the group consisting of: spraying, dipping, inkjet printing and spin-coating. Examples of spraying techniques are air- and gas-assisted spraying.

Preferably, the soluble salt precursor is dissolved in a low surface-tension solvent. Preferable solvents include methanol, ethanol, propanol, methoxypropanol (also know as 1-methoxy-2-propanol, PGME, 1-methoxypropan-2-ol, propylene glycol methyl ether), acetone and butyl carbitol. When choosing solvents for the soluble salt precursor, factors to be taken into account include the solubility of the precursor in the solvent, drying rate and how readily the soluble salt precursor layer on the surface will even out due to surface tension effects. Suitable solvents will be readily apparent to one of ordinary skill in the art.

As is detailed above, the soluble salt precursor needs to decompose when heated to form a metal oxide film. Suitable salts include but are not limited to nitrates and metal-organic salts. Metal-organic salts are particularly preferred since they typically form a good film. A preferred salt is an acetylacetonate.

The applicant has found that an even film may be deposited upon the surface by the inclusion of a high molecular weight organic compound such as polyethylene glycol (PEG) in the soluble salt precursor.

For example, for the deposition of (i) a scandia stabilised zirconia (ScSZ) film or (ii) a scandia yttria stabilised zirconia (ScYSZ) film, suitable soluble salt precursors include (respectively) (i) zirconium acetylacetonate and scandium nitrate, and (ii) zirconium acetylacetonate, scandium nitrate and yttrium nitrate. For the deposition of a ceria gadolinia (CGO) film suitable soluble salt precursors include cerium acetylacetonate and gadolinium nitrate. A suitable solvent for such soluble salt precursors is an ethanol and methoxypropanol mix.

As will be noted, the metal oxide film and the resulting layer of metal oxide crystalline ceramic do not need to be formed from a single metal oxide and therefore the soluble salt precursor can comprise a plurality of soluble salts of a plurality of metals.

Preferably, the deposition technique used is atomised spraying, more preferably air atomised spraying. Preferably, spraying occurs using a sonic atomiser or an ultrasonic atomiser. Preferably, deposition step (i) occurs in a single spraying pass. Preferably, deposition step (i) is undertaken at a temperature of 10-100° C., more preferably 15-50° C., more preferably at room temperature. Preferably, the temperature is the surface temperature of the substrate, i.e. deposition step (i) is undertaken with the surface of the substrate (or metal oxide film as appropriate) having a temperature of 10-100° C., more preferably 15-50° C., more preferably at room temperature.

Thus, when spraying the solution of the soluble salt precursor, spraying conditions are preferably optimised to minimise the tendency of the sprayed solution on the surface (or metal oxide film) to pool into droplets. This can be achieved by preferably depositing using atomised spraying in a single pass and ensuring that sufficient liquid is deposited to form an even, coherent film. When using air atomisation, reducing the air used aids formation of the as deposited layer. The additional use of a sonic atomiser or an ultrasonic atomiser also aids the air deposition process, achieving a good, even and coherent deposited film. It is typically not necessary to heat the substrate, a substrate temperature from 15-50° C. being sufficient to achieve a coherent, even film.

Preferably, the layer of soluble salt precursor deposited onto the surface (or metal oxide film) is allowed to even out to a homogeneous thickness prior to drying step (ii). Thus, the method may additionally comprise prior to step (ii) the step of allowing said solution deposited onto said surface to stand for a period of at least 5, 10, 15, 20, 25, 30, 35, 40, 45, 50, 55 or 60 seconds. This post-deposition dwell time preferably occurs in air at standard atmospheric conditions at room temperature, more preferably at a temperature of 15-50° C. During this dwell time, the film typically starts to dry.

The drying step is important since incorrect drying or heating conditions can result in an uneven thickness of the layer of soluble salt precursor (after a drying step) and an uneven layer of metal oxide film on the surface (or metal oxide film). The more uneven that the layer of soluble salt precursor is after drying or the metal oxide film is after heating, the more likely it is to crack, particularly where it is thickest.

The present inventors have found that in particular the controlling of temperature during deposition steps, particularly repeat deposition steps, is technically important—deposition of a layer of the solution of the soluble salt precursor immediately after completion of heating step (iii) with the surface temperature of the substrate/metal oxide film above 100° C. results in rapid drying of the solution and the formation of a soluble salt precursor layer having an uneven thickness, in turn resulting in increased cracking and mechanical defects in the resulting layer of metal oxide crystalline ceramic and reduced product lifespan.

Preferably, at least 90% of the solvent in the deposited solution of the soluble salt precursor is removed by the end of drying step (ii).

Typical conditions for the drying step (ii) are a temperature of 15-50° C., more typically room temperature.

In certain conditions (for example when certain types of solvent are being used or in certain atmospheric conditions), additional heating may be required during the drying step (ii) in order to achieve >90% solvent evaporation. For example, during the drying step the solution of the soluble salt precursor may be heated to about 100° C. for a period sufficient to achieve >90% solvent evaporation.

The drying step removes sufficient solvent (typically >90%) to create a stable, coherent, even film for further processing.

The step of heating the soluble salt precursor on the surface to decompose it and form a metal oxide film preferably involves heating the soluble salt precursor to a temperature of 150-600° C., more preferably to about 550° C.

The step of heating the soluble salt precursor on the surface to 150-600° C. may result in crystallisation starting to occur. Thus, the metal oxide film may therefore be considered to be a semi-crystalline metal oxide film. However, crystallisation is incomplete at the end of heating step (iii) and firing step (v) is still required.

Preferably, the heating is achieved by the use of a rapid heating heat source, such as an infra-red heat source. This can allow the heating to be evenly and conveniently achieved in less than five minutes, preferably less than four, three, two or one minute. More preferably, heating step (iii) occurs for less than 60 seconds. This rapid heating allows for rapid throughput of cells during manufacture processing.

The maximum layer thickness which can be achieved per cycle of deposition, drying and heating is dependent upon the avoidance of cracking either during drying or decomposition (heating).

Preferably, each layer of metal oxide film has a thickness of 10-999 nm, more preferably 25-250 nm, more preferably 50-200 nm, more preferably 75-150 nm, more preferably 100-150 nm.

Steps (i)-(iii) are repeated to define a plurality of layers of metal oxide film on the surface. Preferably, subsequent to the heating step (iii) and prior to the repeat of deposition step (i), the substrate and metal oxide film is cooled to below the decomposition temperature used in heating step (iii), more preferably to <100° C., more preferably to <50° C. In a high volume manufacturing plant, rapid cooling can be achieved by placing the coated substrate (for example a metal foil) onto a cool surface, such as a water cooled metal plate, where the rapid transfer of heat can occur from the relatively low thermal mass substrate to the relatively large, cooler, thermal mass of the metal cooling plate. Other cooling mechanisms will be apparent to one skilled in the art. In a simple process it is possible for the cells to cool in air prior to the next processing stage.

Different soluble salt precursors can be used at each repeat step (iv), thus resulting in the production of a laminar structure within the metal oxide crystalline ceramic. Thus, for example soluble salt precursors selected from the group consisting of: zirconium acetylacetonate, scandium nitrate, and yttrium nitrate can be used in steps (i)-(iii) and in a repeat of steps (i)-(iii) soluble salt precursors can be selected from the group consisting of: cerium acetylacetonate and gadolinium nitrate. Thus, the metal oxide crystalline ceramic layer produced at step (v) will be laminar, consisting of a first crystalline ceramic ScYSZ film and a second crystalline ceramic CGO film.

Both drying and decomposition (heating step (iii)) lead to significant shrinkage of the layer of soluble salt precursor. If the layer is sufficiently thin, the shrinkage stresses that build up as a result of drying and/or decomposition do not result in cracking or mechanical failure and a dense, defect-free metal oxide film is formed. However, if the layer is too thick then the shrinkage stresses can lead to cracking or even delamination and thus failure of the resulting layer of metal oxide crystalline ceramic.

Further shrinkage occurs on crystallisation, and the maximum metal oxide film thickness which can be deposited and decomposed before a crystallisation is that required to avoid cracking on crystallisation. The metal oxide film thickness is determined by the number of successive depositions and decompositions performed before crystallisation, and the thickness of each of these layers is limited as described above.

The actual maximum allowable metal oxide film thickness before crystallisation will be determined by factors such as the material being deposited and its degree of shrinkage on crystallisation, the level of residual material such as carbon left behind from the decomposition process, and the evenness of the deposited layer.

Preferably, after the completion of steps (i)-(iv) the metal oxide film has a thickness in the range 100-999 nm, more preferably 400-600 nm.

Preferably, the layer of metal oxide crystalline ceramic has a thickness of 100-999 nm, more preferably 200-800 nm, more preferably 250-700 nm, more preferably 400-600 nm.

Preferably, at firing step (v) the metal oxide film is substantially fully crystallised, more preferably fully crystallised, into a layer of metal oxide crystalline ceramic.

Preferably, the layer of metal oxide crystalline ceramic is impermeable. Preferably, the layer of metal oxide crystalline ceramic is continuous, i.e. is not cracked, porous, perforated, permeable or otherwise mechanically broken.

If it is desired to provide a thicker layer of metal oxide crystalline ceramic then it is possible to repeat steps (i)-(v), this time the surface being the layer of metal oxide crystalline ceramic previously produced. However, it is typically desirable to avoid additional sintering steps in order to avoid unnecessary metal ion species migration from the substrate into the fuel cell electrolyte and/or electrodes and also to avoid unnecessary oxide layer growth on the substrate.

Thus, the method can additionally comprise the step of:
(vi) repeating at least once steps (i)-(v), the surface being the layer of metal oxide crystalline ceramic previously produced in step (v).

It is thus possible to have an intermediate crystallisation and then deposit further layers on top of the crystallised layer to further increase the overall layer thickness.

When utilising step (vi), each repeat of steps (i)-(v) does not need to be performed using the same conditions as the previous repeat. Thus, different solutions of a soluble salt precursor of the same or different metal oxide crystalline ceramics may be used. Step (iv) may or may not be incorporated in a repeat (v) and if incorporated, steps (i)-(iii) may be repeated a different number of times.

Thus, as well as producing a series of layers of the same metal oxide crystalline ceramic by repeating steps (i)-(v) a desired number of times (the product of which can be treated as a layer of a single material), it is also possible to produce a plurality of discrete layers of metal oxide crystalline ceramic on a surface one on top of the other, each layer of metal oxide crystalline ceramic being different to the previously produced layer of metal oxide crystalline ceramic.

This can be particularly useful when using the method of the present invention in the manufacture of electrolyte interlayers, more particularly in the manufacture of low- or intermediate-temperature metal supported SOFCs. Thus, for example, the present invention can be used in the manufacture of mixed ionic electronic conducting electrolyte layers.

Thus, the method of the present invention is preferably a method of forming an at least one layer of a fuel cell electrolyte. More preferably, it is a method of forming an at least one layer of an electrolyte of a fuel cell selected from the group consisting of: SOFC, IT-SOFC and metal-supported IT-SOFC.

For example (and as detailed above), within an SOFC anode-electrolyte-cathode layer structure, it can be highly desirable to provide an electrically insulating, ion conducting layer within a mixed ionic electronic conducting electrolyte layer. Thus, an interlayer in the form of a gas-impermeable, ion-permeable, electrically insulating, layer of metal oxide crystalline ceramic can be deposited on top of a CGO main layer (a layer of metal oxide crystalline ceramic), and an additional CGO layer deposited on top of the interlayer.

Thus, the method of the present invention may comprise step (vi) as detailed above, wherein:
in the first set of steps (i)-(v) the soluble salt precursor is selected from at least one of the group consisting of: zirconium acetylacetonate, scandium nitrate, and yttrium nitrate; and
in the second set of steps (i)-(v) the soluble salt precursor is selected from at least one of the group consisting of: cerium acetylacetonate and gadolinium nitrate.

It will be apparent to those skilled in the art that the method of the present invention is equally applicable to a range of electrolyte dopant materials, and thus reference to particular electrolyte materials such as ScYSZ apply equally to the whole family of electrolyte materials such as ScSZ, YSZ, ScCeSZ (scandia ceria co-stabilised zirconia) and any other doped stabilised zirconia known in the art. Likewise all mention of CGO/GDC (Ceria gadolinia oxide/Gadolinia doped ceria; the two terms are interchangeable) apply equally to all rare-earth oxide doped ceria systems such as SDC (samaria-doped ceria), PDC (Praseodymium doped ceria) and co-doped systems such as SGDC (Samaria-gadolinia doped ceria). Also, the method of the present invention is equally applicable to the whole range of dopant concentrations known in the art, such as CGO10, CGO20, 8ScSZ and 10Sc1YSZ.

Thus, the metal oxide crystalline ceramic is preferably a doped stabilised zirconia or a rare earth oxide doped ceria. Preferably, the metal oxide crystalline ceramic is selected from the group consisting of: scandia stabilised zirconia (ScSZ), yttria stabilised zirconia (YSZ), scandia ceria co-stabilised zirconia (ScCeSZ), scandia yttria co-stabilised zirconia (ScYSZ), samarium-doped ceria (SDC), gadolinium-doped ceria (GDC), praseodymium doped ceria (PDC), and samaria-gadolinia doped ceria (SGDC).

For example, the method of the present invention can be used to firstly deposit an ScYSZ or ScSZ layer of metal oxide crystalline ceramic onto a CGO electrolyte material, and to secondly deposit a CGO layer of metal oxide crystalline ceramic on top on the previously deposited ScYSZ or ScSZ layer. Thus, an electrolyte can be formed having the structure CGO-ScYSZ-CGO or CGO-ScSZ-CGO.

Thus, the method of the present invention can be used in the manufacture of a fuel cell having the layer structure anode-first electrolyte layer-deposited electrolyte interlayer-second deposited electrolyte layer-cathode, e.g. anode-CGO-ScYSZ-CGO-cathode or anode-CGO-ScSZ-CGO-cathode.

As detailed above, the present invention is particularly useful in depositing a (preferably thin) zirconia layer on a base layer (surface) of doped ceria, with a (preferably thin) doped ceria covering on the zirconia layer. In other embodiments, a doped ceria layer (preferably a thin doped ceria layer) can be deposited on a zirconia base layer (surface). In such embodiments, there is no absolute requirement for a subsequent layer of metal oxide crystalline ceramic (such as a thin zirconia layer) to be deposited on top of the doped ceria layer.

Thus, an electrolyte can be formed having the structure ScYSZ-CGO, ScSZ-CGO. Thus, the method of the present invention can be used in the manufacture of a fuel cell having the layer structure anode-electrolyte-first deposited electrolyte interlayer-cathode, e.g. anode-ScYSZ-CGO-cathode or anode-ScSZ-CGO-cathode. This type of structure is possible where the processing temperature of the adjoining doped ceria layers and zirconia layers is never greater than 1200° C., or more preferably never greater than 1100° C.

In another embodiment, an electrolyte can be formed having the structure CGO-ScYSZ or CGO-ScSZ. Thus, the method of the present invention can be used in the manufacture of a fuel cell having the layer structure anode-electrolyte-first deposited electrolyte interlayer-cathode, e.g. anode-CGO-ScYSZ or anode-CGO-ScSZ. Typical cathodes include LSCF and LSC and LSM. This type of structure is possible where the processing temperature of the adjoining doped ceria layers and zirconia layers is never greater than 1200° C., or more preferably never greater than 1100° C.; and the processing temperature of the adjoining cathode and zirconia layers is never greater than 1100° C., or more preferably never greater than 1000° C.

In other embodiments, the layer of metal oxide crystalline ceramic thickness is graded across the surface. This is particularly useful when the method of the present invention is used in the manufacture of fuel cells since the arrangement of the layer of metal oxide crystalline ceramic can be varied to further improve their in-use efficiency, specifically by varying the layer of metal oxide crystalline ceramic arrangement/thickness in order to improve the low temperature cell performance without allowing excessive electronic leakage. This is achieved by varying the thickness/arrangement of the layer of metal oxide crystalline ceramic according to the in-use gas flow path and temperature profile of the fuel cell.

In more detail, an operating fuel cell stack will have an electrolyte operating temperature gradient generated by a temperature difference along the gas flow path of the cell of typically 50-150° C. This is necessary as the heat generated during fuel cell stack operation is dissipated by a mixture of air-cooling and possibly internal steam reforming of part of the hydrocarbon fuel feed.

In order to remove heat from the fuel cells, air is fed to the cathode side of the stack at a rate substantially in excess of that required to supply oxygen for the fuel cell reaction. The excess air is used to remove heat. However, the supply of a substantial amount of air to cool the stack has a significant penalty in terms of system efficiency, as a potentially significant percentage of the electrical output of the stack can be consumed in driving the blower required to supply the system with air. It is therefore desirable to minimise the amount of air required.

However, assuming the heat to be dissipated is fixed, the lower the mass flow of cooling air supplied, the larger the temperature rise of the air required. The maximum operating temperature of a fuel cell stack is usually constrained by the need to minimise potential degradation problems, which tend to get worse with increasing temperature. In a fuel cell stack whose absolute maximum allowable operating temperature is around 650° C., this therefore implies a significant range of cell operating temperatures, with the temperature rising along the flow path of the cooling air.

It is well known that the internal resistance of an SOFC increases exponentially with a decrease in temperature. This is largely because the ionic conductivity of the electrolyte declines exponentially with decreasing temperature, and the over-potential of the electrodes increases exponentially, particularly the cathode. In addition, the ionic conductivity of zirconia declines by around an order of magnitude between 600° C. and 500° C. Thus, at 600° C. the additional electrolyte resistance from an ScYSZ or ScSZ barrier layer (metal oxide crystalline ceramic layer) is negligible, but at 500° C. it is a significant proportion of the total cell resistance. It is thus highly desirable to minimise fuel cell resistance at lower operational temperatures.

It is also well known that the electronic conductivity of doped ceria under fuel-cell conditions increases exponentially with increasing temperature, and thus the problem of internal short-circuiting is much worse at 600° C. than 500° C. It is therefore desirable to have reduced electronic leakage in the electrolyte at higher temperatures.

The electrically insulating layer, such as the metal oxide crystalline ceramic layer, such as a zirconia layer, such as a scandia yttria co-stabilised zirconia layer can therefore be thin at the end of the cell likely to have a lower in-use operating temperature (in certain embodiments there may be no electrically insulating layer at the end of the cell which will have a lower in-use operating temperature), for example around 500° C., to minimise the additional in-use cell resistance and improve the in-use power density. The layer of metal oxide crystalline ceramic is then made thicker in stages across the surface to the end of the cell which will have a higher in-use operating temperature, for example around 600° C. For example, in an embodiment where a layer of metal oxide crystalline ceramic of scandia yttria co-stabilised zirconia is being deposited on a surface of CGO for a metal supported IT SOFC, its thickness may be graded from 0 nm at the in-use cooler end up to less than 1000 nm, or more preferably to a maximum of 800 nm at the in-use hotter end.

This grading of the thickness of the layer of metal oxide crystalline ceramic can, for example, be achieved using different-sized spraying masks on successive deposition steps (repeats of steps (i)-(iii)) so that the number of layers deposited is varied in different areas of the cell. Alternatively, the grading can be achieved by angling the substrate with respect to the spray direction or by fine control of the spray pattern. Fine control can be readily achieved by the use of ink-jet printing techniques or multi-spray heads.

Thus, also provided according to the present invention is a method for depositing at least one layer of metal oxide crystalline ceramic upon a surface of a substrate, the thickness of said at least one layer of metal oxide crystalline ceramic varying across said surface of said substrate, the method comprising the steps of:

(i) depositing a solution of a soluble salt precursor of a metal oxide crystalline ceramic onto said surface of said substrate to define a layer of said solution of said soluble salt precursor on said surface, said surface being selected from the group consisting of: a metallic surface and a ceramic surface;

(ii) drying said solution of said soluble salt precursor to define a layer of said soluble salt precursor on said surface;

(iii) heating said soluble salt precursor on said surface to a temperature of between 150 and 600° C. to decompose it and form a layer of metal oxide film on said surface;

(iv) repeating steps (i)-(iii) at least one additional time, said solution of said soluble salt precursor being deposited onto said metal oxide film, such that said metal oxide film on said surface comprises a plurality of layers of metal oxide; and (v) firing said substrate with said metal oxide film on said surface at a temperature of 500-1100° C. to crystallise said metal oxide film into a layer of metal oxide crystalline ceramic bonded to said surface of said substrate, the thickness of said at least one layer of metal oxide crystalline ceramic varying across said surface of said substrate, wherein each of steps (i), (iii) and (v) is performed in an air atmosphere.

As noted above, the thickness of the at least one layer of metal oxide crystalline ceramic can be varied across said surface of the substrate by in particular repeating steps (i)-(iii) to define areas of different thickness of metal oxide film, by the use of masks when depositing the solution of a soluble salt precursor, by the use of ink jet printing, and other grading techniques.

In certain embodiments of fuel cell stacks comprising at least one fuel cell, in addition to air cooling some of the stack, cooling is also supplied by the internal reforming of a fraction of the hydrocarbon fuel feed to the fuel cell. In such cases, the temperature profile of the at least one fuel cell will be different, with the hottest region of the at least one fuel cell typically being located in the centre of the fuel cell rather than the end nearest the fuel cell air exhaust. Thus, the thickness of the layer of metal oxide crystalline ceramic is again varied according to the local in-use operating temperature. However, it will result in a grading which is not arranged starting thinnest at the fuel inlet end of the fuel cell to thickest at the fuel exhaust end, rather the thickness being arranged in relation to the operating temperature of the fuel cell. In this way the thickness can also be arranged to be graded across the width of the fuel cell. Thus the interlayer thickness can be graded in all directions to account for any lateral operating temperature variances across the whole of the electrochemically active area of the fuel cell.

As well as relating to the deposition of layers of metal oxide crystalline ceramic onto planar surfaces such as planar fuel cell surfaces, the present invention is also applicable to deposition upon non-planar surfaces. For instance, the method of the present invention can be used in the deposition of layers of metal oxide crystalline ceramic for roll or tube form SOFCs, where the soluble salt precursor solution is deposited by e.g. spraying onto a rotating tube. In other embodiments, a tube can be dipped into a soluble salt precursor solution to cover either one surface of the tube or both surfaces of the tube. Thickness control can be achieved not only by controlling the viscosity characteristics of the solution, but also by rotating the tube during and after dipping. Gradation control on a tubular fuel cell can be controlled by varying the depth of dipping on subsequent dips after the previous layer has dried on the tube. Dipping can also be used for planar fuel cells, where masking is used to protect areas of the cell where the coating is not required or is undesirable.

For circular surfaces such as the surfaces of circular fuel cells, a spray pattern can be used which is suitable for coating a disc. In order to achieve the correct layer of metal oxide crystalline ceramic thickness, the above methodology of deposition, decomposition and crystallisation can be used. Indeed, grading can occur across a surface such as a tubular, cylindrical or circular surface as for a planar surface.

Thus, the method of the present invention provides for the simple and convenient deposition of layers of metal oxide crystalline ceramic, particularly sub-micron layers, without the requirement for high processing temperatures, conventional sintering operations or expensive high-vacuum techniques such as PVD (physical vapour deposition).

It is thus particularly well suited to the deposition of electrolyte interlayers on low- or intermediate-temperature metal supported SOFCs where conventional sintering is made more difficult by the sintering temperature in air or an air containing environment being constrained by the substrate, and processing temperatures cannot exceed 1100° C.

Experiments have shown that the method of the present invention is advantageous for forming excellent interfaces between the metal oxide film/layer of metal oxide crystalline ceramic and the surface (or metal oxide crystalline ceramic layer, as appropriate) below, as the liquid precursor exactly follows the surface topography of the surface. This is difficult to achieve by conventional sintering of dissimilar materials, particularly if the substrate has already been sintered before deposition of the layer above, thus constraining the sintering of the upper layer. Particularly where the interface in question is within an SOFC electrolyte, a poor interface will lead to high ionic resistance as well as being a mechanical weak point and thus resulting in increased product failure and shorter average working life.

Also provided according to the present invention is a surface of a substrate having deposited upon it at least one layer of metal oxide crystalline ceramic according to the method of the present invention.

The invention will be further apparent from the following description with reference to the accompanying figures which show by example only methods for depositing at least one layer of metal oxide crystalline ceramic upon a surface of a substrate. Of the figures.

Figure 3:
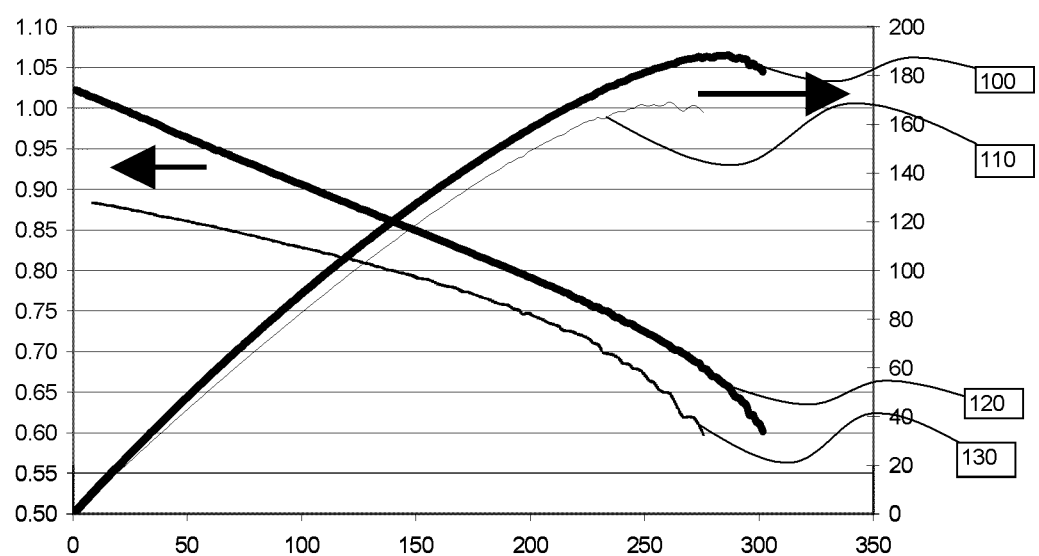
Figures 8, 9:
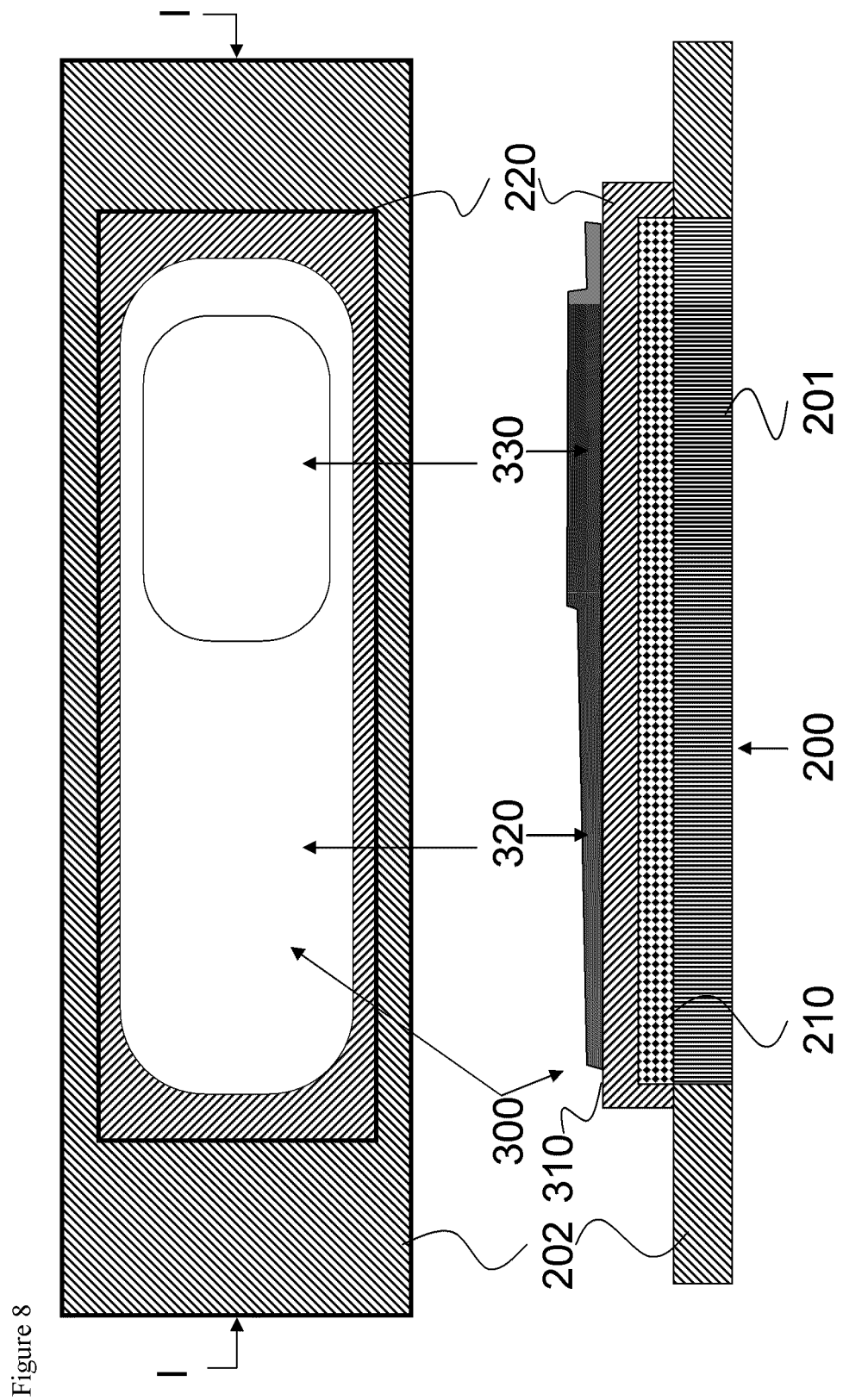
Figures 10, 11:
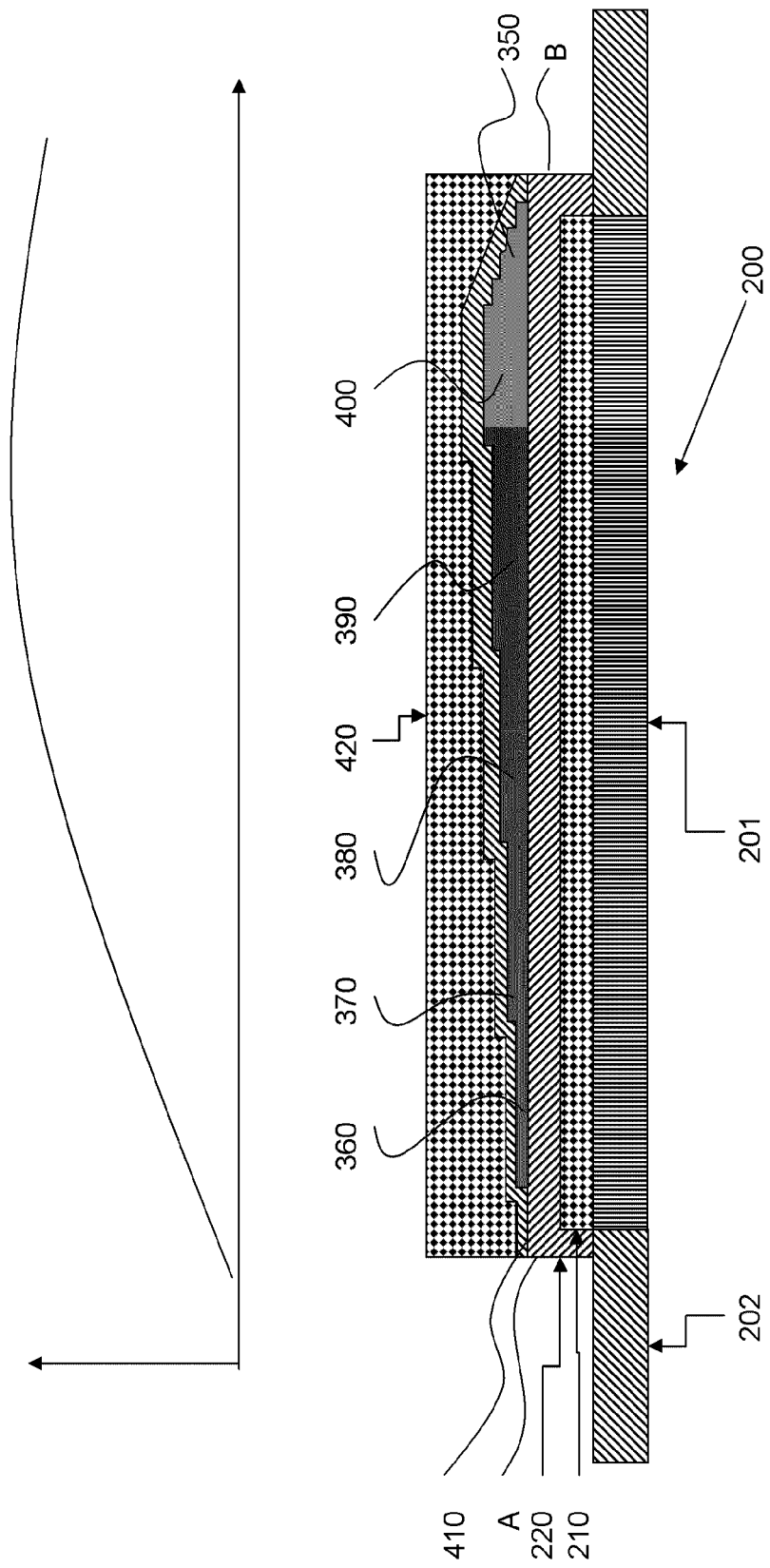
Figures 12, 13:
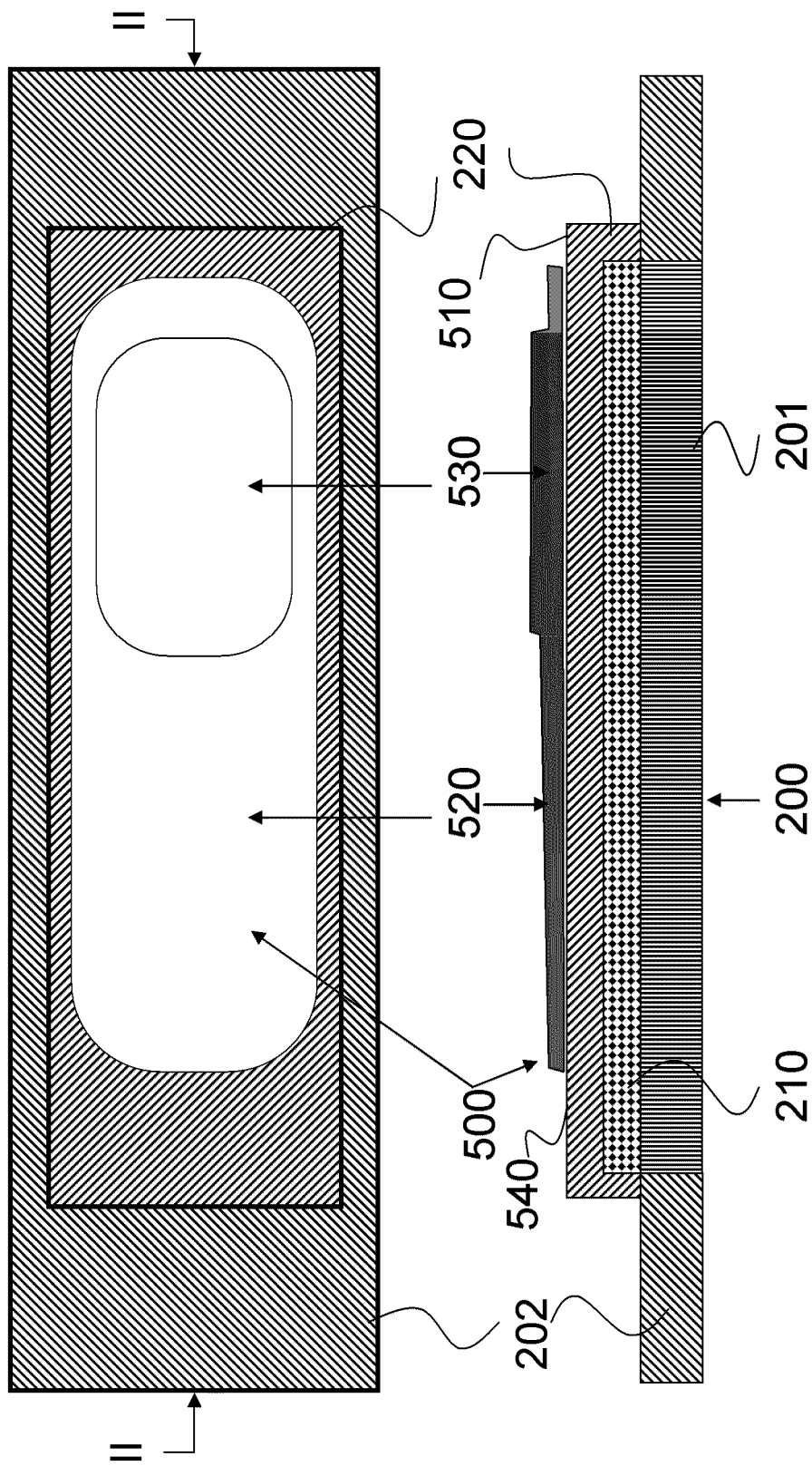

FIG. 3 shows a comparison of performance of metal supported SOFC cells with and without ScSZ barrier layers operating at 570° C. at high fuel utilisation. X-axis shows Current density/mA/cm$^2$; left-most Y-axis shows Cell voltage/V; right-most Y-axis shows Power density/mW/cm$^2$. Reference signs: 100—Power density with barrier; 110—Power density without barrier; 120—Cell voltage with barrier; 130—Cell voltage without barrier;

FIGS. 4-7 show various fuel cell layer structures that can be achieved with the method of the present invention;

FIG. 8 shows a top view of a graded thickness ScYSZ layer;

FIG. 9 shows a cross-section through I-I of FIG. 8;

FIG. 10 shows a fuel cell layer structure having a graded thickness ScYSZ layer;

FIG. 11 shows a plot of in-use electrolyte temperature of fuel cell layer structure of FIG. 10 between points A and B. X-axis shows temperature, left side corresponds to point A, right side corresponds to point B; Y axis shows electrolyte temperature;

FIG. 12 shows a top view of a graded thickness ScYSZ layer; and

FIG. 13 shows a cross-section through II-II of FIG. 12.

In a first embodiment, a ferritic stainless steel foil substrate (as shown in e.g. FIGS. 4-7) defining a perforated region surrounded by a non-perforated region is provided upon which has been deposited an anode layer and a gas impermeable, dense, CGO electrolyte layer 10 which is 10-15 micron thick on top of the anode layer, as taught in GB2434691 (foil substrate 4, anode layer 1a and electrolyte layer 1e) and WO 02/35628. In other embodiments (not shown) perforated foil substrates upon which is deposited an anode layer and a gas impermeable, dense electrolyte layer are used (GB2440038, GB2386126, GB2368450, U.S. Pat. No. 7,261,969, EP1353394, and U.S. Pat. No. 7,045,243). In a further embodiment (not shown) the graded metal substrate of US20070269701 is used.

An interlayer 20 of crystalline ceramic scandia yttria co-stabilised zirconia (10Sc1YSZ; $(Sc_2O_3)_{0.1}(Y_2O_3)_{0.01}(ZrO_2)_{0.89}$) is then formed on top of the CGO layer by performing steps (a)-(f) below. This is a particularly useful interlayer material since zirconium salts are not highly soluble and have a tendency to precipitate out. Thus, the dopant levels in the deposited layer of soluble salt precursor can exhibit a slight variance and the addition of 1% Yttria helps avoid the phase instability which can occur in >9% ScSZ.

The steps are:
(a) air atomised spraying a layer of 0.1M cation concentration solution of $Sc(NO_3)_3$ and $Y(NO_3)_3$ and $Zr(C_5H_7O_2)$ in 90% volume ethanol and 10% volume methoxypropanol (soluble salt precursors which will form the scandia yttria co-stabilised zirconia) at RTP onto the CGO layer.

(b) drying the soluble salt precursor layer at RTP in air for 60 seconds during which period the soluble salt precursor evens out across the surface, followed by further drying at 100° C. for 30 seconds.

(c) heating the soluble salt precursor to 550° C. over a total period of 60 seconds using an infra-red (IR) heating lamp which decomposes and semi-crystalises it to form a layer about 125 nm thick of a semi-crystalline scandia yttria co-stabilised zirconia film.

(d) repeating steps (a)-(c) 4 times, the substrate and metal oxide film being cooled to a temperature of 35-80° C. prior to each repeat of step (a), to give a metal oxide and semi-crystalline film having a total thickness of about 500 nm. This film does not have any cracks in it and is suitable for further processing.

(e) firing at 800° C. for 60 minutes in air, the metal oxide film of scandia yttria co-stabilised zirconia forms a fully crystalline ceramic layer 20 of scandia yttria co-stabilised zirconia, having a thickness of about 400 nm.

(f) Repeating steps (a)-(e) once more to achieve a final layer 20 thickness of about 800 nm The next steps are:
(g) the repeating of steps (a)-(e) once more but this time depositing a layer 30 of CGO on top of the previously deposited crystalline ceramic layer of scandia yttria co-stabilised zirconia. Specific conditions are: 0.1M cation concentration $Ce(C_5H_7O_2)$ and gadolinium nitrate in 70% volume ethanol and 30% volume methoxypropanol and spraying, depositing and processing as before but using a final crystallisation firing temperature of 980° C. to achieve a CGO layer with a final thickness of 250 nm. This layer acts as a barrier layer between the scandia yttria co-stabilised zirconia layer and a subsequently deposited cathode layer.

(h) finally, a cathode layer 40 is then deposited on top of the previously deposited CGO layer. This is done by screen-printing an LSCF cathode and processing it in accordance with WO2006/079800. This layer has a thickness of about 50 μm.

Thus, an overall structure is created comprising the following layers deposited on the ferritic stainless steel support:
(A) NiO-CGO anode;
(B) CGO (10)
(C) scandia yttria co-stabilised zirconia (20)
(D) CGO (30)
(E) cathode (40)

Figure 1:
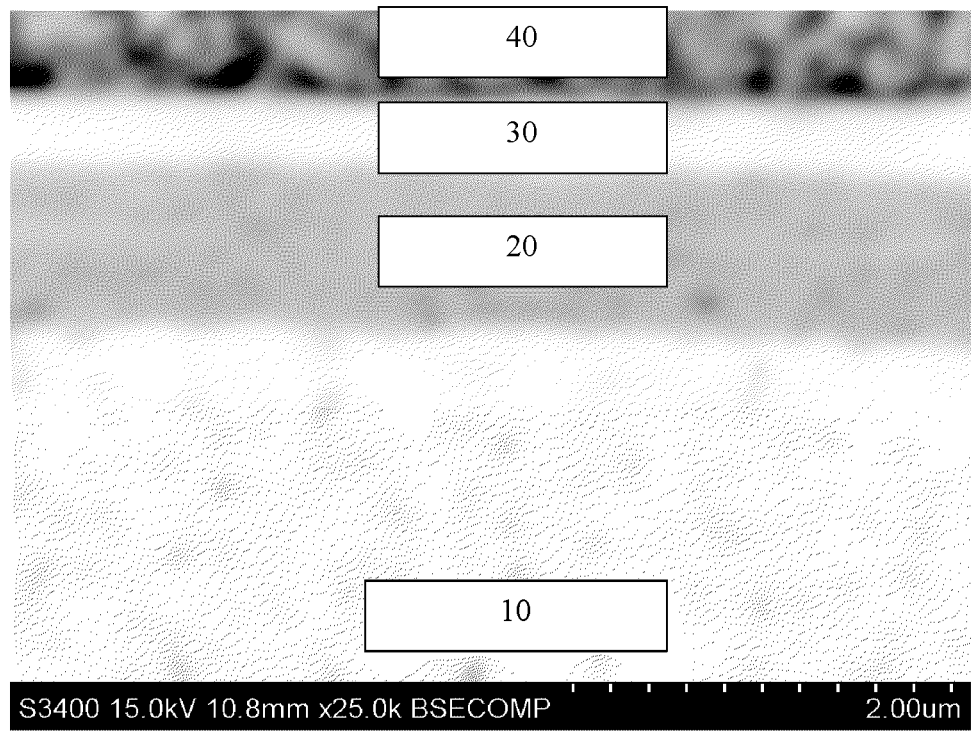
FIG. 1 shows a scanning electron microscopy (SEM) cross-section at ×25000 magnification of part of an SOFC electrolyte manufactured by the method of the present invention.

The results of the method detailed above are shown in FIG. 1. The main CGO layer 10 has been deposited on top of the anode layer (not shown in FIG. 1).

It should be noted that the maximum processing temperature used in the manufacture of the zirconia layer and the CGO layer was 980° C., which is significantly below the temperature at which zirconia and CGO start to react, which is 1200° C.

The results of the above method are shown in the Figures. On top of main CGO layer 10 is ScYSZ interlayer 20 which has a thickness of 800 nm. Testing shows it to have high ionic conductivity and good phase stability. ScYSZ interlayer 20 has density comparable with main CGO layer 10 and a very good interface with main CGO layer 10. This layer is present to electronically insulate cathode 40 from the main electrolyte layer 10 whilst allowing the passage of an ionic current, and thus eliminate the internal short-circuiting inherent in operating a CGO or other doped ceria electrolyte alone.

On top of interlayer 20 is a CGO interlayer 30 which has a thickness of ≈0.25 μm. This layer is present to separate the cathode material from the zirconia of interlayer 20, improving the catalytic activity of cathode 40 by an effective electrolyte-cathode interface of high ionic conductivity. This also avoids potentially detrimental chemical interactions between cathode 40 and the zirconia of interlayer 20 either during processing or possibly during service.

An important aspect of this embodiment is the high density of interlayer 20. This high density is required for the effective blocking of internal short circuiting, because it has been shown that CGO, particularly in its reduced state, has significant catalytic activity for the reduction of oxygen. Thus, if the interlayer 20 is not gas-impermeable (say, is <=93% dense), oxygen will diffuse through interlayer 20 and reduce on the top of main CGO layer 10, allowing a path for internal short-circuiting, bypassing cathode 40 entirely.

Figure 2:
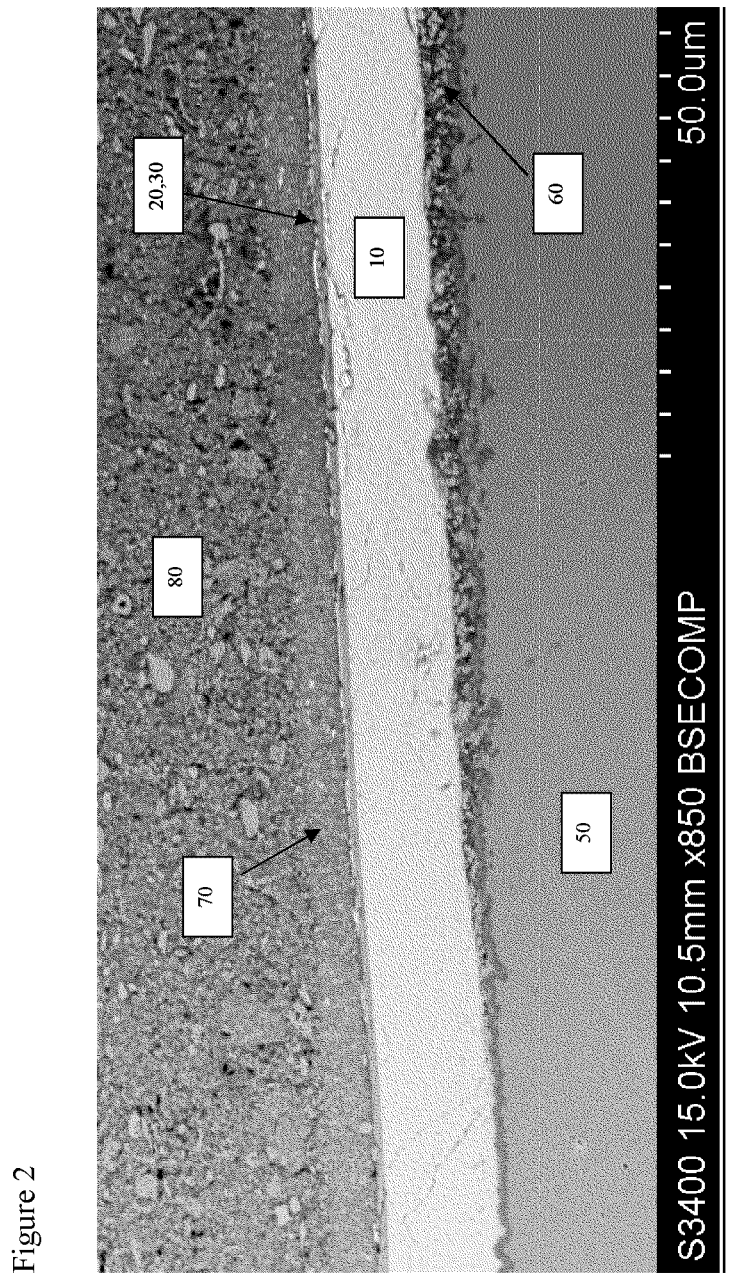
FIG. 2 shows an SEM cross-section at ×850 magnification of part of an SOFC electrolyte manufactured by the method of the present invention near the edge of the anode, and showing overlap of the electrolyte onto the steel substrate.

As can be seen from FIG. 2, it shows a cross-section of the edge (60) of an anode in a fuel cell. On the right hand side of the figure there is a clear anode layer deposited upon ferritic stainless steel substrate 50, but towards the left hand side of the figure main CGO layer 10 is deposited directly onto ferritic stainless steel substrate 50.

FIG. 2 also shows the relative scale of main CGO layer as compared to ScYSZ interlayer 20 and CGO interlayer 30. Cathode 40 can be seen to comprise cathode active layer 70 and cathode current collector 80.

FIG. 3 shows a comparison of VI and power curves of first and second metal supported SOFCs with CGO main electrolytes, showing the benefit of a thin ScYSZ barrier layer deposited using the method of the present invention.

The first SOFC is constructed according to the first embodiment (above). The second SOFC is constructed identically to the first SOFC except that it does not include the scandia yttria co-stabilised zirconia layer 20 and the additional CGO layer 30 on top.

As can be seen from FIG. 3, cell voltages and power densities are significantly increased. In particular, there is a much higher open-circuit voltage as a result of the blockage of electronic leakage through the CGO electrolyte.

In a second embodiment (not shown), the first CGO layer is a 2% Co-doped CGO layer. The doping is used as a sintering aid to aid densification of the CGO electrolyte at a lowered sintering temperature compared to an un-doped CGO electrolyte. The ScYSZ interlayer 20 and the additional CGO layer 30 are prepared and deposited and processed in the same way as for the first embodiment.

In a third embodiment the deposition of the layer of CGO on top of the previously deposited layer of scandia yttria co-stabilised zirconia is preceded by a repeat of steps (a)-(e) in which an additional layer of scandia yttria co-stabilised zirconia is deposited (i.e. on top of the previously deposited layer of scandia yttria co-stabilised zirconia).

In a fourth embodiment, a graded thickness layer of metal oxide crystalline ceramic is provided on a CGO surface for subsequent use in the manufacture of an IT-SOFC. In-use, the layer of metal oxide crystalline ceramic is an electrolyte interlayer, the interlayer thickness being graded across the in-use gas flow path of the fuel cell in order to improve the low temperature cell performance without allowing excessive electronic leakage.

FIGS. 4-7 show various fuel cell layer structures that can be achieved with the method of the present invention.

Figure 4:
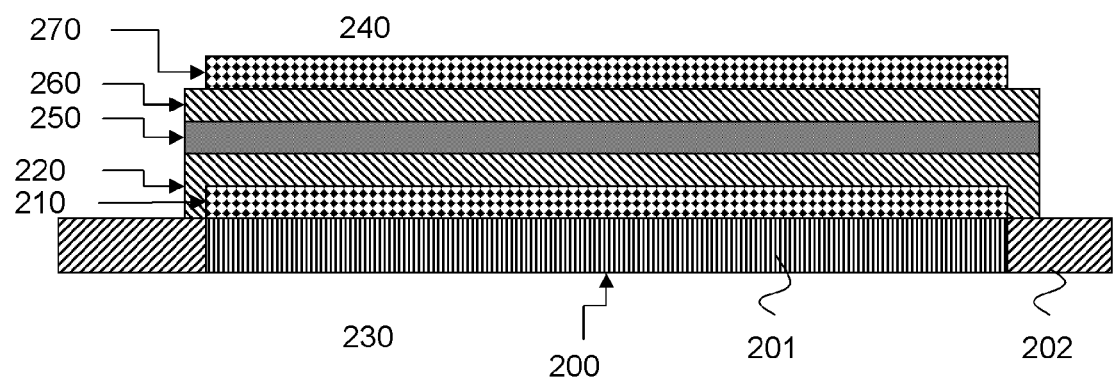

As can be seen from FIG. 4, in a fourth embodiment a fuel cell is to be constructed, and a ferritic stainless steel metal substrate 200 with an anode layer 210 on top of it and an electrolyte layer 220 are provided. Electrolyte layer 220 surrounds anode layer 210 in order to prevent gas flowing through anode 210 between fuel side 230 and oxidant side 240. Scandia yttria co-stabilised zirconia crystalline ceramic layer 250 is then deposited on top of ceramic CGO layer 220, and CGO crystalline ceramic layer 260 is then deposited on top of layer 250. The spraying steps used in the deposition of layers 250 and 260 results in a "layer cake" type structure.

Subsequent to the deposition of layers 250 and 260, the fuel cell is completed with the addition of cathode assembly 270.

Figure 5:
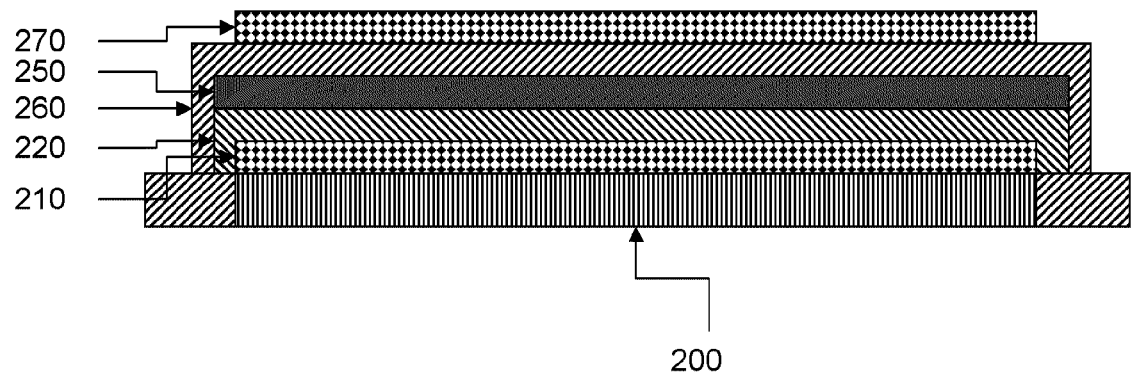

FIG. 5 shows a fifth embodiment in which CGO layer 260 overlaps and contains the other layers 220, 250. Notably, in this embodiment the layer of metal oxide crystalline ceramic (CGO layer 260) is deposited both onto the ceramic layer underneath (scandia yttria co-stabilised zirconia layer 250) and also ferritic stainless steel substrate 200. The spraying steps used in this embodiment results in a "contained layer" type structure.

Figure 6:
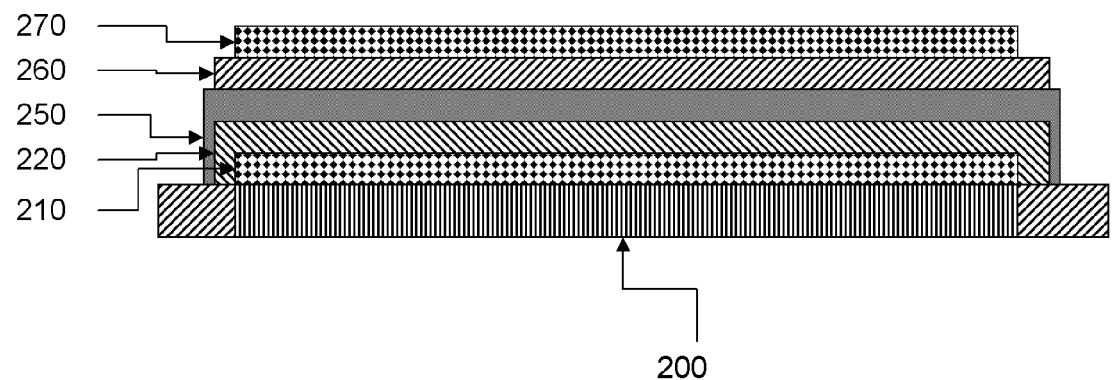

FIG. 6 shows a sixth embodiment in which scandia yttria co-stabilised zirconia layer 250 overlaps CGO layer 220. Again, in this embodiment the layer of metal oxide crystalline ceramic (in this case scandia yttria co-stabilised zirconia layer 250) is deposited both onto the ceramic layer underneath (CGO layer 220) and also ferritic stainless steel substrate 200. The spraying steps used in this embodiment results in an "overlap" type structure.

Figure 7:
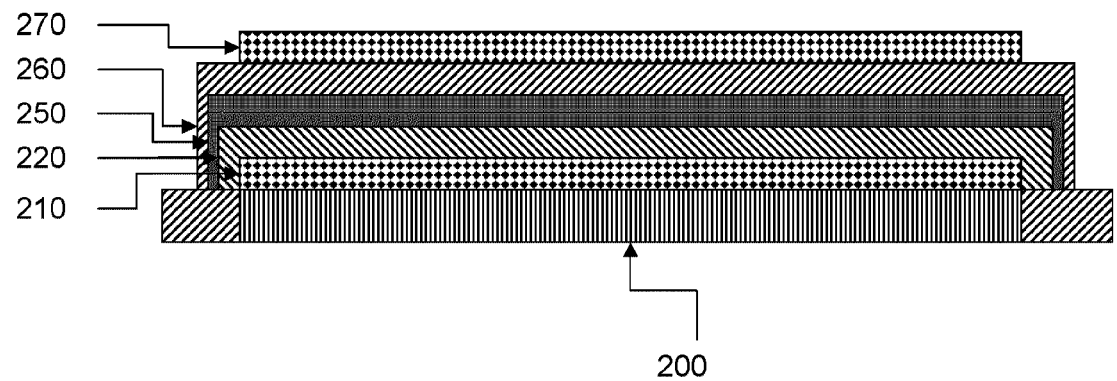

FIG. 7 shows a seventh embodiment in which scandia yttria co-stabilised zirconia layer 250 overlaps CGO layer 220 and in turn is overlapped by CGO layer 260. In this embodiment both layers of metal oxide crystalline ceramic (CGO layer 260 and scandia yttria co-stabilised zirconia layer 250) are deposited onto both the ceramic layer underneath (and scandia yttria co-stabilised zirconia layer 250 and CGO layer 220 respectively) and also ferritic stainless steel substrate 200. The spraying steps used in this embodiment results in a "contained overlap" type structure.

FIGS. 8 and 9 show an eighth embodiment in which a scandia yttria co-stabilised zirconia (ScYSZ) layer 300 has a graded thickness across the surface of CGO layer 220. As detailed above for the first embodiment, a ferritic stainless steel foil substrate 200 defining a perforated region 201 surrounded by a non-perforated region 202 is provided upon which has been deposited an anode layer 210 and a gas impermeable, dense, CGO electrolyte layer 220 10-15 micron thick on top of the anode layer 210.

The ScYSZ layer 300 is then deposited on top with a first step being a two-stage spraying operation using the basic method as described above for the first embodiment. The layer 300 is crystalline ceramic scandia yttria co-stabilised zirconia (10Sc1YSZ; $(Sc_2O_3)_{0.1}(Y_2O_3)_{0.01}(ZrO_2)_{0.89}$) and is formed as follows: First, steps (a)-(d) (above) are performed to give a first area 320 of metal oxide film. A mask is then placed over the metal oxide film so as to leave only a portion of it exposed, and steps (a)-(d) are then repeated to define a second area 330 in which the layer of metal oxide film consists two films of metal oxide.

Step (e) is then performed to form crystalline ceramic ScYSZ layer 300. The area 320 has a thickness of about 400 nm and the area 330 has a thickness of about 800 nm.

It should be noted that the crystalline ceramic ScYSZ layer 300 does not totally overlap CGO electrolyte layer 220—as can be seen at 310 there is an area where CGO electrolyte layer 220 overlaps anode layer 210 but which is then not overlapped by crystalline ceramic ScYSZ layer 300.

FIG. 10 shows a fuel cell electrolyte structure 340. As detailed above for the first embodiment, a ferritic stainless steel foil substrate 200 defining a perforated region 201 surrounded by a non-perforated region 202 is provided upon which has been deposited an anode layer 210 and a gas impermeable, dense, CGO electrolyte layer 220 10-15 micron thick on top of the anode layer 210.

An ScYSZ layer 350 is then deposited on top in a multi-stage spraying operation using the basic method as described above for the first embodiment. The layer 350 is crystalline ceramic scandia yttria co-stabilised zirconia (10Sc1YSZ; $(Sc_2O_3)_{0.1}(Y_2O_3)_{0.01}(ZrO_2)_{0.89}$) and is formed by performing steps (a)-(d) above, but with step (a) being accomplished using inkjet printing. This results in a first area 360 of soluble salt precursor which is heated to give a metal oxide film.

A series of repeats of steps (a)-(d) are then performed, each repeat occurring over only a portion of the area from the previous inkjet printing step, thus defining second, third, fourth and fifth areas 370, 380, 390 and 400.

Step (e) is then performed to define a metal oxide crystalline ceramic layer, areas 360, 370, 380, 390 and 400 having thicknesses of about 150, 300, 450, 600 and 750 nm respectively.

Step (g) is then performed to deposit CGO interlayer 410 on top of ScYSZ layer 350 having a thickness of ≈0.25 μm.

Step (h) is then performed to deposit cathode layer 420.

In-use operating temperatures of the CGO layer (electrolyte) 220 are shown in FIG. 11. As can be seen, the gradation in operational temperature is matched by the gradation in thickness of ScYSZ layer 350.

FIGS. 12 and 13 show an embodiment similar to that for FIGS. 8 and 9 in which a crystalline scandia yttria co-stabilised zirconia (ScYSZ) layer 500 has a graded thickness across the surface of CGO layer 220 and where the crystalline ceramic ScYSZ layer 500 does not totally overlap CGO electrolyte layer 220 or the anode layer 210—as can be seen at 510 there is an area where CGO electrolyte layer 220 overlaps anode layer 210 but which is then not overlapped by crystalline ceramic ScYSZ layer 500, and at 540 there is an area where CGO electrolyte layer 220 overlaps anode layer 210 but which neither the CGO electrolyte layer 220 or the anode layer 210 is then overlapped by crystalline ceramic ScYSZ layer 500.

As detailed above for the first embodiment, a ferritic stainless steel foil substrate 200 defining a perforated region 201 surrounded by a non-perforated region 202 is provided upon which has been deposited an anode layer 210 and a gas impermeable, dense, CGO electrolyte layer 220 10-15 micron thick on top of the anode layer 210.

The ScYSZ layer 500 is then deposited on top with a first step being a two-stage spraying operation using the basic method as described above for the first embodiment. The layer 500 is crystalline ceramic scandia yttria co-stabilised zirconia (10Sc1YSZ; $(Sc_2O_3)_{0.1}(Y_2O_3)_{0.01}(ZrO_2)_{0.89}$) and is formed as follows: First, steps (a)-(d) (above) are performed to give a first area 520 of metal oxide film. A mask is then placed over the metal oxide film so as to leave only a portion of it exposed, and steps (a)-(d) are then repeated to define a second area 530 in which the layer of metal oxide film consists two films of metal oxide.

Step (e) is then performed to form crystalline ceramic ScYSZ layer 500. The area 520 has a thickness of about 400 nm and the area 530 has a thickness of about 800 nm.

It should also be noted that the crystalline ceramic ScYSZ layer 500 does not totally overlap CGO electrolyte layer 220 or the anode layer 210—as can be seen at 540 there is an area where CGO electrolyte layer 220 overlaps anode layer 210 but which neither the CGO electrolyte layer 220 or the anode layer 210 is then overlapped by crystalline ceramic ScYSZ layer 500.

It will be appreciated that the present invention is not limited to the above examples only, other embodiments falling within the scope of the appended claims being readily apparent to a person of ordinary skill in the art.

REFERENCE SIGNS

10—main CGO layer
20—ScSZ interlayer
30—CGO interlayer
40—cathode
50—ferritic stainless steel substrate
60—anode edge
70—cathode active layer
80—cathode current collector
100—Power density with barrier
110—Power density without barrier
120—Cell voltage with barrier
130—Cell voltage without barrier
200—ferritic stainless steel substrate
201—perforated region
202—non-perforated region
210—anode layer
220—CGO layer
230—fuel side
240—oxidant side
250—scandia yttria co-stabilised zirconia layer
260—CGO layer
270—cathode assembly
300—scandia yttria co-stabilised zirconia (ScYSZ) layer
310—area of CGO electrolyte layer 220 not overlapped by ceramic ScYSZ layer 300
320—first area of scandia yttria co-stabilised zirconia (ScYSZ) layer 300
330—second area of scandia yttria co-stabilised zirconia (ScYSZ) layer 300
340—fuel cell electrolyte structure
350—ScYSZ layer
360—first area
370—second area
380—third area
390—fourth area
400—fifth area
410—CGO interlayer
420—cathode layer
500—crystalline scandia yttria co-stabilised zirconia (ScYSZ) layer
510—area of CGO electrolyte layer 220 not overlapped by ceramic ScYSZ layer 500
520—first area of scandia yttria co-stabilised zirconia (ScYSZ) layer 500
530—second area of scandia yttria co-stabilised zirconia (ScYSZ) layer 500
540—area of anode layer 210 and CGO electrolyte layer 220 not overlapped by ceramic ScYSZ layer 500

The invention claimed is:

1. A method for depositing at least two layers of an SOFC electrolyte on a substrate that is a main electrolyte layer of the electrolyte, in which the at least two layers are metal oxide crystalline ceramic layers deposited upon the substrate, said substrate being a substantially impermeable mixed ionic electronic conducting electrolyte ceramic material, the method comprising the steps of:

(i) depositing a solution of a soluble salt precursor of a metal oxide crystalline ceramic onto a surface of the substrate to define a layer of said solution of said soluble salt precursor on said surface;

(ii) drying said solution of said soluble salt precursor to define a layer of said soluble salt precursor on said surface;

(iii) heating said soluble salt precursor on said surface to a temperature of between 150 and 600° C. to decompose it and form a layer of metal oxide film on said surface;

(iv) sequentially depositing, drying and heating at between 100 and 600° C. at least one additional layer of the solution of the soluble salt precursor to form a plurality of layers of metal oxide film; and (v) firing said substrate with said plurality of layers of metal oxide film at a temperature of 500-1100° C. to crystallise said plurality of layers of metal oxide film into a layer of metal oxide crystalline ceramic bonded to said substrate, said layer of metal oxide crystalline ceramic being ion-permeable, electrically insulating, and gas-permeable and said layer of metal oxide crystalline ceramic providing at least a part of an interlayer for the SOFC electrolyte;

(vi) sequentially depositing, drying and heating at between 100 and 600° C. at least one further solution of a further soluble salt precursor of a further metal oxide crystalline ceramic to form a plurality of layers of a further metal oxide film on the interlayer;

(vii) firing said substrate with said plurality of layers of a further metal oxide film at a temperature of 500-1100° C. to crystallise said plurality of layers of a further metal oxide film into a further layer of metal oxide crystalline ceramic, said further layer of metal oxide crystalline ceramic being a mixed ionic electronic conducting electrolyte material and said further layer of metal oxide crystalline ceramic providing at least a part of a barrier layer between the interlayer and a subsequently deposited cathode layer; and (viii) subsequently depositing the cathode layer;

wherein:

each of steps (ii), (iii), (v) and (vii) is performed in an air atmosphere;

said interlayer of metal oxide crystalline ceramic is thinner than the main electrolyte layer provided by the substantially impermeable mixed ionic electronic conducting electrolyte ceramic material substrate; and said interlayer is also to electrically insulate the subsequently deposited cathode layer from the main electrolyte layer.

2. A method according to claim 1, wherein said main electrolyte layer is a CGO electrolyte layer.

3. A method according to claim 1, wherein:

in steps (i)-(v) said soluble salt precursor is selected from at least one of the group consisting of: zirconium acetylacetonate, scandium nitrate, and yttrium nitrate; and in steps (vi)-(vii) said further soluble salt precursor is selected from at least one of the group consisting of: cerium acetylacetonate and gadolinium nitrate.

4. A method according to claim 1, wherein each deposition of a solution of a soluble salt precursor of a metal oxide crystalline ceramic is undertaken with its receiving surface having a temperature of 10-100° C.

5. A method according to claim 1, wherein said surface of said substrate is substantially impermeable to the soluble salt precursor deposited thereon.

6. A method according to claim 1, wherein at least one of the layers of metal oxide crystalline ceramic or further metal oxide crystalline ceramic comprises doped stabilised zirconia.

7. A method according to claim 6, wherein that at least one layer of metal oxide crystalline ceramic or further metal oxide crystalline ceramic is a ceramic selected from the group consisting of: scandia stabilised zirconia (ScSZ), yttria stabilised zirconia (YSZ), scandia ceria co-stabilised zirconia (ScCeSZ), and scandia yttria co-stabilised zirconia (ScYSZ).

8. A method according to claim 1, wherein at least one of the layers of metal oxide crystalline ceramic or further metal oxide crystalline ceramic comprises rare earth oxide doped ceria.

9. A method according to claim 8, wherein at least one of the layers of metal oxide crystalline ceramic or further metal oxide crystalline ceramic is a mixed ionic electronic conducting electrolyte material metal oxide crystalline ceramic is selected from the group consisting of: samarium-doped ceria (SDC), gadolinium-doped ceria (GDC), praseodymium doped ceria (PDC), and samaria-gadolinia doped ceria (SGDC).

10. A method according to claim 1, wherein the soluble salt precursor of steps (i)-(iv) is selected from at least one of the group consisting of: zirconium acetylacetonate, scandium nitrate, yttrium nitrate, cerium acetylacetonate and gadolinium nitrate.

11. A method according to claim 1, wherein a solvent for the soluble salt precursor or the further soluble salt precursor is selected from at least one of the group consisting of: methanol, ethanol, propanol, methoxypropanol, acetone and butyl carbitol.

12. A method according to claim 1, additionally comprising prior to step (ii) the step of allowing said solution deposited onto said surface to stand for a period of between 5 and 60 seconds.

13. A method according to claim 1, wherein said layer of said soluble salt precursor on said surface has a thickness between 10 and 999 nm.

14. A method according to claim 1, wherein said plurality of layers of metal oxide film each have a thickness less than 1 micron.

15. A method according to claim 1, wherein said layer of metal oxide crystalline ceramic bonded to said substrate has a thickness between 100 and 999 nm.

16. A method according to claim 1, wherein said layer of metal oxide crystalline ceramic bonded to said substrate is at least 90% dense.

17. A method according to claim 1 wherein at least 90% of a solvent in the deposited solution of said soluble salt precursor and a solvent in the deposited further solution of said further soluble salt precursor is removed by the end of its respective drying step, prior to its respective heating step.

18. A method according to claim 1, wherein the deposited solution of the soluble salt precursor of the metal oxide crystalline ceramic and the deposited further solution of the further soluble salt processor of the further metal oxide crystalline ceramic are deposited by a method selected from the group consisting of: spraying, dipping, inkjet printing and spin-coating.

19. A method according to claim 1, wherein said substrate is CGO, said interlayer is ScYSZ or ScSZ, and said barrier layer is CGO.

20. A surface of a substrate, wherein said substrate is a substantially impermeable mixed ionic electronic conducting electrolyte material, and said surface is a ceramic surface, said surface having deposited upon it at least two layers of metal oxide crystalline ceramic by way of the method according to claim 1.

21. A method for depositing at least two layers of an SOFC electrolyte on a substrate that is a main electrolyte layer of the electrolyte, in which the at least two layers are metal oxide crystalline ceramic layers deposited upon the substrate, said substrate being a substantially impermeable mixed ionic electronic conducting electrolyte ceramic material, the method comprising the steps of:
  (i) depositing a solution of a soluble salt precursor of a metal oxide crystalline ceramic onto a surface of the substrate to define a layer of said solution of said soluble salt precursor on said surface;
  (ii) drying said solution of said soluble salt precursor to define a layer of said soluble salt precursor on said surface;
  (iii) heating said soluble salt precursor on said surface to a temperature of between 150 and 600° C. to decompose it and form a layer of metal oxide film on said surface;
  (iv) sequentially depositing, drying and heating at between 100 and 600° C. at least one additional layer of the solution of soluble salt precursor to form a plurality of layers of metal oxide film;
  (v) sequentially depositing, drying and heating at between 100 and 600° C. at least one further solution of a further soluble salt precursor of a further metal oxide crystalline ceramic to form a plurality of layers of a further metal oxide film; and
  (vi) firing said substrate with said plurality of layers of metal oxide film and said plurality of layers of said further metal oxide film at a temperature of 500-1100° C. to crystallise a) said plurality of layers of metal oxide film into a layer of metal oxide crystalline ceramic bonded to said substrate, said layer of metal oxide crystalline ceramic being ion-permeable, electrically insulating, and gas-impermeable and said layer of metal oxide crystalline ceramic providing at least a part of an interlayer for the SOFC electrolyte, and b) said plurality of layers of said further metal oxide film into a further layer of metal oxide crystalline ceramic, said layer of metal oxide crystalline ceramic being a mixed ionic electronic conducting electrolyte material and said layer of metal oxide crystalline ceramic providing at least a part of a barrier layer between the interlayer and a subsequently deposited cathode layer; and
  (vii) subsequently depositing the cathode layer;
wherein;
  each of steps (ii), (iii), and (vi) is performed in an air atmosphere;
  said interlayer of metal oxide crystalline ceramic is thinner than the main electrolyte layer provided by the substantially impermeable mixed ionic electronic conducting electrolyte ceramic material substrate; and
  said interlayer is also to electrically insulate the subsequently deposited cathode layer from the main electrolyte layer.

22. A method according to claim 21, wherein said main electrolyte layer is a CGO electrolyte layer.

23. A method according to claim 21, wherein:
  in step (i)-(iv) said soluble salt precursor is selected from at least one of the group consisting of: zirconium acetylacetonate, scandium nitrate, and yttrium nitrate; and
  in step (v) said further soluble salt precursor is selected from at least one of the group consisting of: cerium acetylacetonate and gadolinium nitrate.

* * * * *